May 11, 1937.   R. CHILTON   2,079,683
TRANSMISSION
Filed Feb. 27, 1936   3 Sheets-Sheet 1
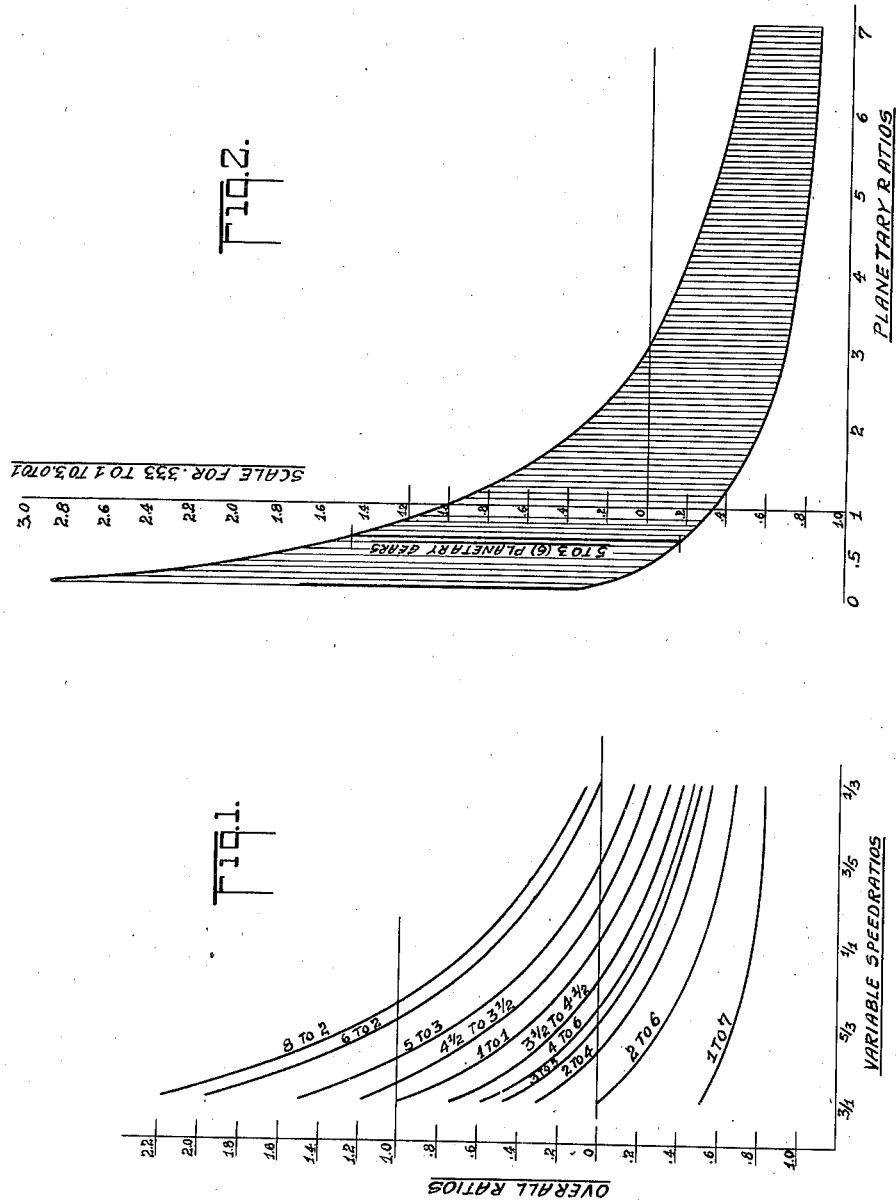
INVENTOR
ROLAND CHILTON
BY
ATTORNEY

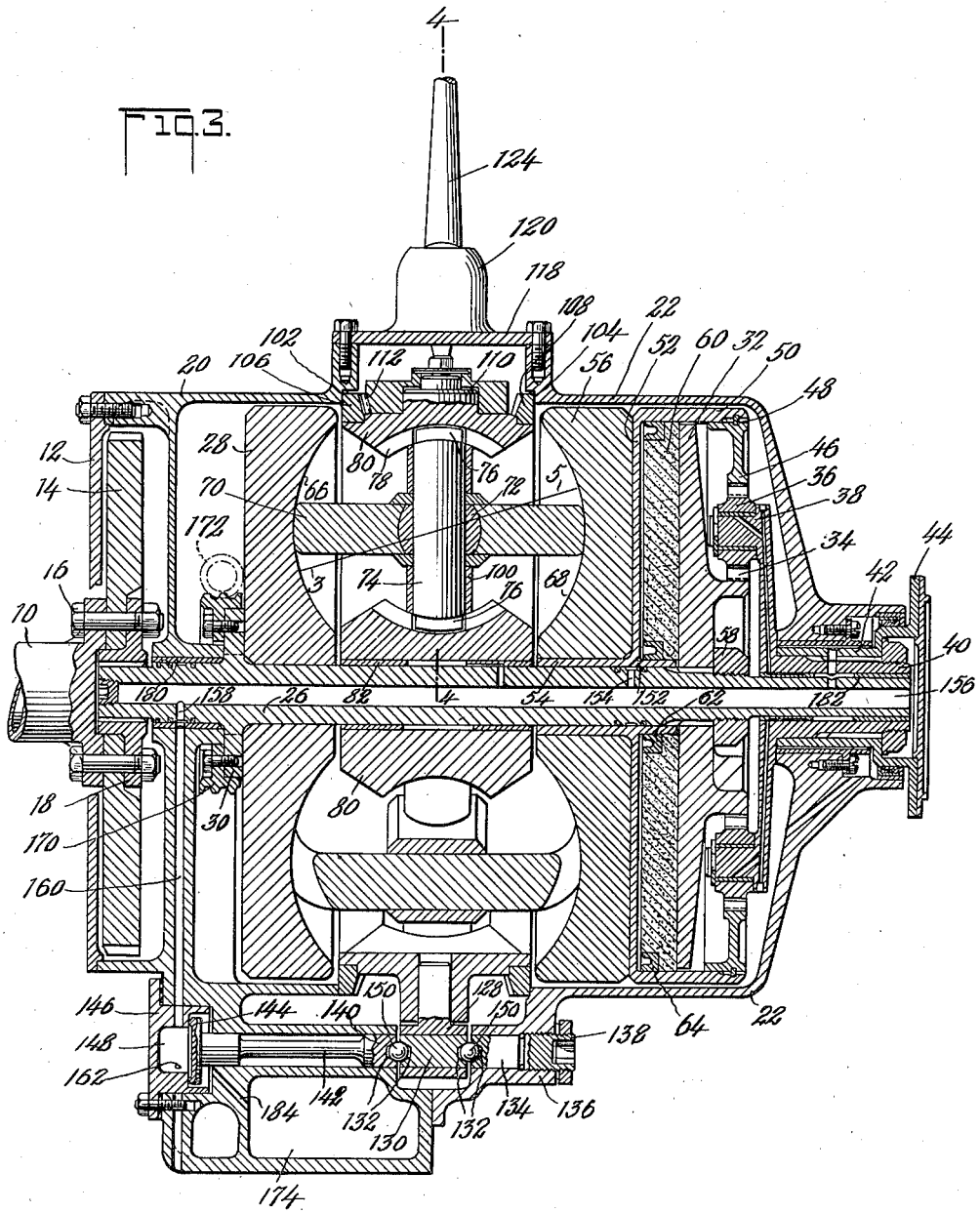

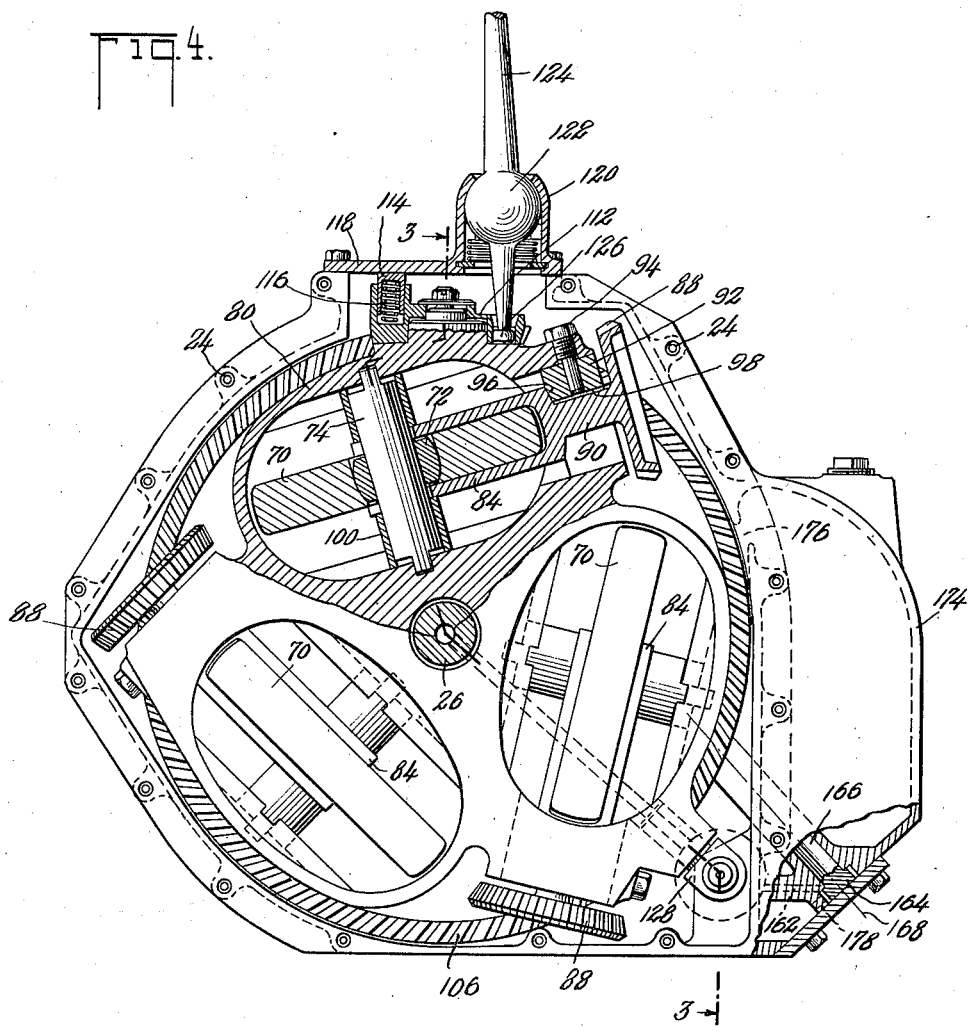

Patented May 11, 1937

2,079,683

UNITED STATES PATENT OFFICE 2,079,683

TRANSMISSION

Roland Chilton, Ridgewood, N. J.

Application February 27, 1936, Serial No. 65,973

12 Claims. (Cl. 74—285)

This invention relates to transmissions, and in certain aspects comprises a continuing development on my co-pending cases Serial Nos. 669,144; 728,058; 742,751; 742,752; 743,515; 746,958; 759,-349; 25065; 25066; 40919 and 40920.

This series of inventions discloses a new infinitely variable speed transmission organization, and teaches a wide variety of new devices directed to the many problems inherent in these units. A prime object of the present invention is to teach how certain of these new devices may be adapted to the environment of previously known types of transmissions, and specifically to the well known toroidal disc type.

Toroidal disc type transmissions are now going into use in industrial applications, as for machine tool drives, where a ratio range from 1:3 to 1:⅓ is adequate. For automotive use, however, a transmission which will go down to 1:0 ratio, and so eliminate the use of the usual friction clutch and neutral shift lever for starting the vehicle, is very desirable. Such a transmission, with an infinitely variable range extending beyond zero would also eliminate the reverse sliding shift gears now also used when toroidal type transmissions are applied to automobiles. Accordingly an important object of the present invention resides in the provision of a simple organization whereby the ratio range of a conventional toroidal transmission may be extended to include zero and reverse rotation of the driven means whilst retaining an overspeed range beyond the 1.1 ratio position, as is also desirable for automotive use.

An associated object of the invention is to provide an organization wherein the torque to which the friction driving contacts are subject is less than the torque on the driven shaft, thereby to increase the capacity of a given transmission.

The transmission shown in the drawings is, in part, of the known type wherein opposed toroidal discs are connected for ratio change by friction wheels restrained from planetary rotation by a torque-responsive contact loading means. This organization has the great advantage of maintaining the contact pressure proportional to the driving effort in spite of the wide changes in the radii of the disc contacts but, in the prior art, had the disadvantage of introducing two thrust bearings subject to full contact load and disc speed. The capacity of these transmissions depends upon the magnitude of the contact load which may be safely applied to the discs, and, when thrust bearings are interposed, each of these must sustain whatever load is effective on the discs, so that the thrust capacity of the bearings themselves must be as great as that of the main power transmitting discs and rollers, while the friction losses at each bearing will be as great as that at the usefully employed roller driving contacts. Thus the additional friction loss involved in these conventional double thrust bearings may be twice the friction losses in the power transmitting elements themselves. The known alternate construction wherein the contact loading means is responsive to disc torque, results in a three to one error in the contact load when the radius of contact shifts through that range.

The present invention accordingly teaches how the hydraulic torque-responsive contact loading means of application Serial No. 759,349, above referred to (since issued as U. S. Patent No. 2,040,-833) may be adapted to toroidal disc transmissions to the elimination of thrust bearing losses whilst maintaining the desired contact pressure relationship. Novel means whereby the hydraulic sealing means are protected from wear due to relative rotation comprises an associated object of the invention.

A further important object of the invention resides in improved and simplified mechanism for controlling the ratio changing angulation of the friction wheels.

Other objects of the invention will be obvious from, or will be pointed out in the following description, with reference to the drawings, in which:

Fig. 1 is a family of curves illustrating ratio relationships;

Fig. 2 comprises envelope curves of the end ratios of Fig. 1;

Fig. 3 is a longitudinal section through a single-sided embodiment of the invention on the line 3—3 of Fig. 4;

Fig. 4 is an end view with the rear cover and disc removed, the upper roller being shown in section on the line 4—4 of Fig. 3, while the lower right corner is a fragmentary section through the oil pump.

Referring first to the means for providing zero and reverse ratios in a transmission having only a limited range of speed increase and decrease, the family of curves (Fig. 1) show graphically how, by the inclusion of a simple planetary gear, according to the present invention, an extremely wide selection of ratio ranges is afforded. This family of curves refers to the specific (preferred) case wherein gears are organized for rotation with respective toroidal discs, and connected by planet pinions carried by the driven shaft of the transmission. The figures identifying respective curves represent the planetary ratio (the first quoted figure referring to the gear associated with the driven disc). The curves are based on a transmission having a variable ratio range of from 3:1 to 1:3 plotted as abscissae; the overall ratios resulting from various planetary gear ratios being plotted as ordinates.

It will be noted that the curve in the middle of this range is for 1.1 planetary ratio (requiring bevel gears) and that this organization gives a ratio range from 1.1 through zero down to .333 minus.

The end ratio envelope of these curves is plotted in Fig. 2 with the planetary ratios as abscissae, whereas the right hand ordinate scale applies to a variable ratio range of from .333 to 3 times (as in the transmission shown in the drawings).

From this envelope curve the planetary ratio for any desired overall ratio range may be selected by inspection. For example, for automobile use, a range from 1.5 overspeed through 1.1 down to zero and therebeyond into reverse is desirable and such a range is indicated by the line marked 5:3 planetary ratio. Accordingly this is the planetary ratio indicated in the drawings.

A ratio of .333 represents about the lowest driven speed that has heretofore been obtained with a non-planetizing friction wheel toroidal transmission such as here shown, but these curves show that it is possible by incorporating the appropriate ratio of planetary gear, related to the other members as herein taught, to extend the low end of the ratio range through zero and into the reverse range as is necessary for progressively variable speed vehicle operation including stopping and starting, and reversing, which may thus be progressively effected by a single-lever ratio control to the entire elimination of clutches and/or shift gears, in accordance with a prime object of the invention.

Referring now to the single-sided embodiment of Figs. 3 and 4, 10 designates the crankshaft and 12 the back plate of a conventional engine, having the usual flywheel 14, secured by bolts 16, which also secure a splined driving hub 18. Secured to the back plate 12 is a front transmission housing 20, to which is in turn secured a rear transmission housing 22, by studs 24. The transmission main shaft 26 is splined into the drive hub 18 and drives a driving disc 28 by dogs engaging a flange 30. Also splined to the main shaft 26 is a thrust disc 32 incorporating a gear 34 engaged by planet pinions 36 carried on journals 38, integral with a driven shaft 40 as shown. Splined on the driven shaft 40 is a sleeve 42 having a coupling flange 44.

Also meshed with the planet pinions 36 is a ring gear 46 splined at 48 into a cylinder member 50 having an end wall 52 and hub 54 upon which is mounted a driven disc 56, for free rotation of these parts upon the driving shaft 26.

Within the cylinder 50, abutting the thrust disc 32, which is restrained on the main shaft 26 by a nut 58, is a disc 60 carrying sealing rings 62—64; the disc 60 being made of bearing material slightly porous to oil under pressure such as manufactured in bushings under the trade name of "Oilless".

The opposed faces of the discs 28—56 are of toroidal form as shown at 66—68 and spaced therebetween are rollers 70 mounted on spherical bushings 72 on spindles 74 having end-keys 76 engaged in arcuate slots 78 in a cage member 80, freely mounted on the drive shaft 26 on bushings 82. Engaging the rollers 70 are forks 84 integral with hypoid pinions 88 by the necks 90 (upper Fig. 4), surrounded by horseshoe thrust collars 92 secured in suitable bores in the cage 80 by dowel screws 94. The thrust collars 92 abut the forks 84 at spherical shoulders 96 and clearance is allowed at 98 for tilting of the control member 84—88—90 with the roller 70 upon the spherical bushing 72 in the plane of Fig. 4. The roller ends of the forks 84 are located axially of the spindles 74 by distance pieces 100.

Rotatably carried upon the cage 80 and free for rotation against the abutment shoulders 102—104 of the housings 20—22 are opposed similar hypoid ring gears 106—108 engaging respectively opposite sides of the control pinions 88.

Carried on a stub 110 integral with the cage 80 is a hypoid quadrant 112 engaging one, only, of the control ring gears (in this showing 106). The hypoid quadrant 112 is provided with a friction button 114 urged by a spring 116 into engagement with a cover 118 having a socket 120 in which is engaged a ball 122 of a control lever 124 having a downward ball-ended extension 126 engaging a hole in the control quadrant 112 as shown. The control assemblage just described is arranged for alternate assembly with the quadrant 112 engaging one or another of the control ring gears 106—108 according to the direction of rotation imparted to the driving disc 28 by the engine shaft 10.

The cage or roller carrier 80 is restrained from rotation by an eye 128 in which is slidable a plunger 130 having angular pockets 132 at each end, similar pockets being provided in an abutment plug 134 carried in a boss 136 in the housing 22 and adjustable by a screw plug 138 as well as in the end 140 of the spindle 142 of a relief or pressure control valve 144 cooperating with a seat member 146 having a cavity 148 and secured to the housing as shown. Balls 150 are engaged in the pockets 132 to comprise a torque-responsive device to be more fully described hereinafter.

In addition to the cylinder 50 and the piston 60 and the thrust plate 32, the hydraulic system of the transmission includes an angular hole 152 communicating by a hole 154 to an axial hole 156 in the driving shaft 26, and thence by a hole 158 in that shaft, and a further passage 160 in the housing, to the cavity 148 of the relief valve 144. This cavity also communicates by means of a hole 162 with a gear pump 164 (right hand bottom corner of Fig. 4). The pump 164 has a driving shaft 166 extending upwardly on the axis 168 where it engages a helical gear 170 (Fig. 3) by means of a helical pinion 172 (indicated by dotted lines as it is necessarily shown out of true projected position in Fig. 3).

At the right hand side of Fig. 4 will be seen an oil sump 174, the top of which communicates with the interior of the housing 20 by a bailing slot 176 and from the bottom of which sump the pump 164 draws oil through a suction hole 178.

The driving shaft 26 is supported in suitable bushings 180—182 in the housing 20 and driven shaft 40 and suitable oil seals engage the bushings 180 and 54 to minimize leakage where the oil is transferred through these bushings. A drain hole 184 connects the back of the relief valve 144 to return oil issuing therefrom to the sump 174.

The operation of the device is as follows: The driving shaft 26, driving disc 28, and the gear 34 at all times rotate unitarily with the engine shaft 10, thus rotating the driven disc 56, cylinder 50, and ring gear 46 backwards at a speed ratio determined by the contact position of the rollers 70 upon the toroids 66—68; the position shown corresponding to one-to-one ratio between discs, as usual. The overall ratio, however, is modified by the planetary gear of this invention and in the instant case, where the gears 46—34 have a ratio of 5 to 3, the overall ratio is .25 at one-to-one variable speed ratio (see curve marked 5 to 3, Fig. 1). It will be seen that, had the gears 46—34 equal diameters (requiring a bevel planetary gear) then one-to-one variable speed ratio position, giving equal forward and backward speed to these gears, would result in zero speed of the planet journals 38 and driven shafts 32—34. However, such a combination would have one-to-one for its highest overall speed ratio, thus failing to realize the advantages of the over-speed range afforded by the proportions shown. The actual ratio in the variable speed organization for zero overall ratio is 3/5, the corresponding roller position being indicated by the line 3—5, Fig. 3.

It should be noted that the driving effort at the teeth 46—34 is one-half the driving effort at the journals 38 of the driven shaft, and that the torque to which the driven disc 56 is subject is the same as that on the gear 46, hence the torque on the driven disc is substantially less than the output torque of the whole transmission, whereby the resultant driving capacity of any given variable speed transmission is substantially increased or, alternatively, a smaller transmission may be used for a given output torque than with the transmissions of the prior art wherein the driven shaft is directly connected to the driven disc.

The operation of the hydraulic torque-responsive contact loading organization is as follows: As soon as the engine shaft 10 is started, the pump 164 delivers oil to the loading piston and cylinder 52—60 and to the relief valve 144, the oil pressure being determined by the loading of this valve through the torque-responsive balls 150 which comprise the abutment restraining the roller carrier 80 from rotation. Thus the oil pressure is at all times proportional to the torque on the roller carrier which in turn is at all times proportional to the tangential driving effort at the roller and disc contacts regardless of the fact that the radius of these contacts upon the discs may vary in three-to-one ratio.

The thrust disc 32 is rotating relative to the cylinder 50 whilst these parts are subject to torque-responsively metered hydraulic pressure, and such rotation has produced excessive wear on rotating piston sealing rings subject to high hydraulic pressures. In the present invention, however, these rings engage the plate 60 made of porous material maintaining lubrication between this disc and the contacted thrust disc 32 at a pressure which is always proportional to the load. In fact the disc 60 may be said to be floating in the hydraulic fluid whereby the thrust bearing losses will be reduced to mere fluid friction. The friction of the packing rings 64 will then be sufficient to keep the disc 60 rotating with the cylinder 50 whereby wear at the packing rings is eliminated.

The operation of the control mechanism is as follows: The roller control forks 84, with the control pinions 88 are mounted for angulation with the rollers and pins 74, as the latter oscillate in their arcuate tracks 78 and, in addition, the pinions and their associated forks are organized to tilt the rollers slightly from their normal rectangular relationships with the pins 74 (herein also referred to as the tangential relationship). When rotational effort is applied to one of the control ring gears 106, from the control lever 124, through the quadrant 112, the effort is incapable of angulating the rollers in their radial planes because this would require slipping the rollers sidewise over the toroidal disc surfaces under the heavy contact pressures existing. Such rotational effort on the control ring gears will accordingly slightly displace the control pinions 88, moving the rollers slightly off tangency. With the discs and rollers in rapid rotation the immediate effect is to steer the rollers inwardly on one disc and outwardly on the other, the control pinions following any such rotation of the rollers and thus restoring the tangential status instantly the rotational effort is removed from the control ring gear. There is thus provided a greatly simplified form of sensitive follow-up control whereby the rollers precess only to the extent that such precession is followed up by the control, and whereby the rollers are automatically stabilized in any precessed position in which the control may be set. This stability, however, is only valid in one direction of driving disc rotation which is the reason for providing alternate control ring gears, for appropriate assembly of the control quadrant to suit either a right hand or a left hand rotating engine.

One of the ring gears is always floating and as such performs an important function in co-operating with the controlled ring gear to maintain all the rollers in identical precessed positions by also maintaining them in identical tangency or off tangency relation. This hypoid control gear organization represents a great simplification over the various linkage systems of the prior art. Great accuracy as to symmetry in the control elements is necessary, and this is hard to control in manufacture in most of the known mechanisms. In the present construction such symmetry resides principally in the tooth spacing of the gears which is commercially controllable to fine limits. This also applies to the symmetry of the spindles 74 in their arcuate slots 78 and here again the extreme simplicity of the machining operations involved is of advantage.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In anti-friction contact loading devices for transmission members subject to relative rotation, hydraulic piston and cylinder means associated with respective transmission members, sealing rings for said piston and cylinder means, and a disc carrying said sealing rings and rotatably contacting one of said means.

2. Anti-friction contact loading means for transmission members subject to relative rotation comprising, in combination, hydraulic piston and cylinder means associated with respective transmission members, sealing rings for said piston and cylinder means, and a disc carrying said sealing rings and rotatably contacting one of said means, said disc being oil pervious for the lubrication of said rotating contact by the hydraulic pressure fluid.

3. The combination with relatively rotating transmission members to be contact loaded, of hydraulic piston and cylinder means for loading said members, a sealing ring for said hydraulic piston and cylinder means, and a disc carrying said sealing ring and rotatably contacting one said means, said disc being of porous material whereby seepage of hydraulic fluid therethrough lubricates said rotating surface with pressure proportional to the load thereon.

4. A thrust bearing and contact loading means for a transmission comprising, in combination, a piston member and a cylinder member subject to relative rotation, a disc rotatably contacting one member, and a ring adapted to seal the joint between said disc and the other member, said disc being permeable to hydraulic fluid under pressure for the lubrication of said rotational contact.

5. A transmission including, in combination, opposed toroidal discs, rollers each mounted for disc-contact-shifting angulation about individual tangential axes and for slight off-tangency displacement thereof, hypoid gears each organized for angulation and displacement with respective rollers, a pair of opposed ring gears concentric with said discs and engaging respective sides of said hypoid gears, and control means for rotating one of said ring gears, whereupon all said hypoid gears and rollers are first displaced from tangential relation to the discs whose rotation accordingly angulates the rollers, but only so long as said angulation is followed up by the control movement of said ring gear.

6. The combination with a pair of opposed toroidal transmission discs, of a variable speed driving connection therebetween comprising rollers contacting said discs, means mounting said rollers for slight pivotal displacement about said contacts from a normally tangential relation to the disc contact circles and for ratio changing angulation of each roller about it tangential axis, hypoid pinions mounted to partake of said movements with respective rollers, and a ring gear engaging each pinion and controllably rotatable to effect said pivotal displacement and to follow the resulting angulation until arrested by said control, whereupon further angulation restores the tangential relation whereby the angular status is maintained until the ring be moved again.

7. In a transmission, in combination, opposed toroidal discs, rollers having rolling contact with each disc, means to tilt said rollers about lines joining said contacts to initiate angulation of the rollers about tangential axes at right angles to said lines, hypoid gears on each axis mounted for tilting and angulation with respective rollers, ring gears concentric with the discs and engaging opposite sides of said roller gears, and means to controllably rotate one of said ring gears.

8. A transmission including, in combination, opposed toroidal discs, rollers each having a point of contact with each disc and tiltable about said points from a normally tangential disposition to to steer said rollers to various angular positions, hypoid pinions organized for tilting and angulation with respective rollers, and ring gears engaging said pinions and restraining all said rollers and gears to equal tilting and angulation.

9. A transmission including, in combination, opposed toroidal discs, rollers each having a point of contact with each disc and tiltable about said points from a normally tangential disposition to steer said rollers to various angular positions, hypoid pinions organized for tilting and angulation with respective rollers, ring gears engaging said pinions and restraining all said rollers and gears to equal tilting and angulation, and control means engaging one of said ring gears.

10. A transmission including, in combination, opposed toroidal discs, rollers each having points of contact with respective discs and mounted for slight angulation about lines joining said points and about tangential axes at right angles to said lines, hypoid pinions on said axes engaging the rollers for angulation therewith about both said axes, and a controllably rotatable ring gear engaging said pinions.

11. In a transmission, in combination, rollers each mounted for angulation about two rectangularly related axes, hypoid pinions organized for angulation with the rollers about both said axes, and a control ring gear means connecting said pinions for equal and simultaneous angulation of all the rollers.

12. The combination with a transmission comprising opposed toroidal discs and rollers steerable for disc contact shifting angulation, of steering control means including hypoid pinions each rigid with a fork adapted to steer and to angulate with respective rollers, and a control ring gear means connecting said pinions for equal movement.

ROLAND CHILTON.